US009007627B2

(12) United States Patent
Kawasaki (10) Patent No.: US 9,007,627 B2
(45) Date of Patent: Apr. 14, 2015

(54) IMAGE READING APPARATUS AND IMAGE FORMING APPARATUS (75) Inventor: Kenichiro Kawasaki, Osaka (JP)

(73) Assignee: Kyocera Document Solutions Inc., Osaka-shi (JP)

( * ) Notice: Subject to any disclaimer, the term of this patent is extended or adjusted under 35 U.S.C. 154(b) by 147 days.

(21) Appl. No.: 13/482,561

(22) Filed: May 29, 2012

(65) Prior Publication Data
US 2012/0306981 A1    Dec. 6, 2012

(30) Foreign Application Priority Data
May 31, 2011    (JP) .................................. 2011-121167

(51) Int. Cl.
H04N 1/04        (2006.01)
H04N 1/028       (2006.01)
G03G 15/043      (2006.01)
G03G 15/04       (2006.01)

(52) U.S. Cl.
CPC ....... *H04N 1/02835* (2013.01); *G03G 15/0435* (2013.01); *G03G 15/04072* (2013.01)

(58) Field of Classification Search
USPC .................. 358/1.15, 474, 505, 475
See application file for complete search history.

(56) References Cited

U.S. PATENT DOCUMENTS 5,575,549 A  * 11/1996  Ishikawa et al. ............... 362/625
5,971,559 A  * 10/1999  Ishikawa et al. ............... 362/625
6,601,962 B1 *  8/2003  Ehara et al. ..................... 362/612
8,331,006 B2 * 12/2012  Levola ............................ 359/238
2003/0076669 A1 *  4/2003  Itoh et al. ......................... 362/31
2004/0252483 A1 * 12/2004  Cheng ............................... 362/31
2007/0274100 A1 * 11/2007  Yang et al. ..................... 362/615
2008/0002429 A1     1/2008  Noba
2008/0285309 A1 * 11/2008  Fang et al. ..................... 362/620
2009/0015753 A1 *  1/2009  Ye ..................................... 349/64

(Continued)

FOREIGN PATENT DOCUMENTS

CN     101834970 A    9/2010
CN     101900299 A   12/2010

(Continued)

OTHER PUBLICATIONS

Notice of Reasons for Rejection issued to JP Application No. 2011-121167 mailed Aug. 14, 2013.
Office Action issued to corresponding CN Application No. 201210163657.0 , Apr. 18, 2014.

*Primary Examiner* — Houshang Safaipour
(74) *Attorney, Agent, or Firm* — Knobbe Martens Olson & Bear LLP (57) ABSTRACT

An image reading apparatus includes a LED that emits white light, a light guiding body, and a photoelectric conversion element. The light guiding body is disposed along the main scanning direction. The light guiding body includes an incident surface, a plurality of groove portions, an emission surface, and a scattering portion. The incident surface is formed on one end in a longitudinal direction, faces the light emitting surface of the LED that emits white light, and receives incident light that is emitted from the light emitting surface. The plurality of groove portions is formed on the incident surface and is formed concentrically to the center of the incident surface. The emission surface is formed along the main scanning direction. The scattering portion scatters light and includes a plurality of prisms. The scattering portion is opposed to the light emitting surface and is disposed along the main scanning direction.

4 Claims, 9 Drawing Sheets

(56) References Cited

U.S. PATENT DOCUMENTS

| | | |
|---|---|---|
| 2009/0015883 A1 | 1/2009 | Kim |
| 2009/0015884 A1 | 1/2009 | Cho et al. |
| 2009/0015886 A1 | 1/2009 | Kim et al. |
| 2010/0014315 A1 | 1/2010 | Fujimoto |
| 2010/0231987 A1 | 9/2010 | Takeuchi |
| 2010/0302801 A1* | 12/2010 | Lin et al. ............ 362/606 |
| 2011/0157661 A1 | 6/2011 | Kim et al. |
| 2013/0016385 A1 | 1/2013 | Kim |

FOREIGN PATENT DOCUMENTS

| | | | |
|---|---|---|---|
| JP | 11-185516 | 7/1999 | |
| JP | 2005-285702 A | 10/2005 | |
| JP | 2008-010291 A | 1/2008 | |
| JP | 2009-022007 A | 1/2009 | |
| JP | 2008-219337 A | 9/2009 | |
| JP | 2010-213039 | * 9/2010 | ............ H04N 1/04 |

\* cited by examiner

IMAGE READING APPARATUS AND IMAGE FORMING APPARATUS

INCORPORATION BY REFERENCE

This application is based on and claims the benefit of priority from Japanese Patent Application No. 2011-121167, filed on 31 May 2011, the content of which is incorporated herein by reference.

BACKGROUND

This disclosure relates to an image reading apparatus and an image forming apparatus provided with the image reading apparatus.

An image forming apparatus, such as a copying machine or the like that forms an image on paper using an electrographic method, includes an image reading apparatus configured to optically read a document image. In recent years, an LED is used as a light source for the image reading apparatus in substitution for a conventional xenon lamp or a cold cathode lamp.

Figure 7:
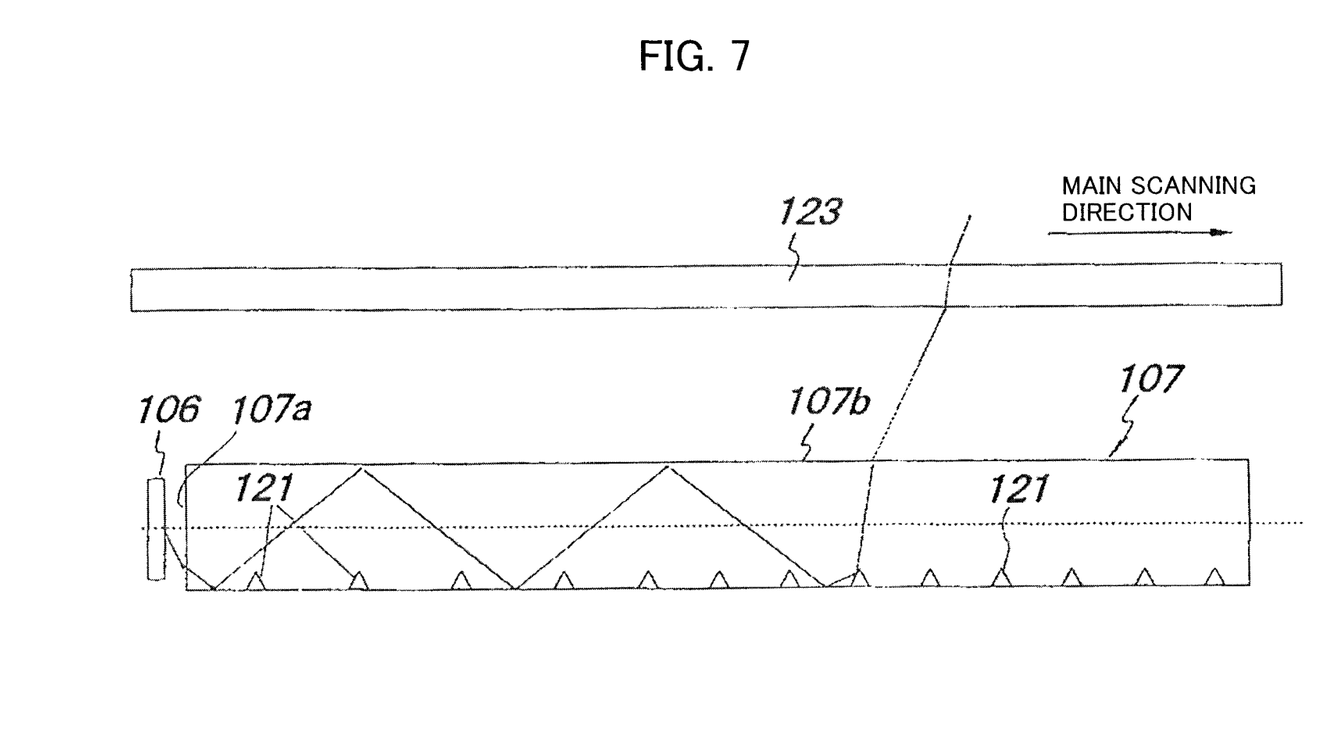
FIG. 7 is a side view illustrating the illumination portion of a image reading apparatus employing a side-light method.

An image reading apparatus using an LED as a light source includes a type that uses a side-light method in which light emitted from an LED disposed on one end in the main scanning direction is introduced into the main scanning direction by a light guiding body. FIG. 7 illustrates the configuration of an illumination unit of a conventional image forming apparatus employing a side-light method.

FIG. 7 is a side view of the illumination unit of the image reading apparatus employing a side-light method. As illustrated in FIG. 7, an LED 106 is disposed as a light source on one end of the main scanning direction (the transverse direction in FIG. 7). A cylindrical light guiding body 107 is disposed in proximity to the LED 106 along the main scanning direction. An incident surface 107a of one end in the main scanning direction of the light guiding body 107 faces the LED 106. Prisms 121 that include a plurality of V-shaped grooves on a lower surface are disposed on the opposite side to an emission surface 107b on the upper surface of the light guiding body 107 at a suitable interval in the main scanning direction. A platen glass 123 is provided above the light guiding body 107 to mount the document.

When the LED 106 is illuminated, the light becomes incident from the incident surface 107a of the light guiding body 107 on an inner portion of the light guiding body 107 while being subjected to refraction in accordance with Snell's law as illustrated in FIG. 7, and is completely reflected by the inner surface of the light guiding body 107 and is propagated in the main scanning direction. A part of that light is reflected by the incident surface of the prism 121, is emitted from the emission surface 107b through the platen glass 123, and illuminates a document that is mounted on the platen glass 123.

The adoption of this type of side-light method has the advantage of reducing the number of LEDs 106 that are used as a light source in the image reading apparatus (image forming apparatus). This type of side-light method is advantageous from a cost consideration. In addition, there is the advantage that loss of light energy due to propagation in the inner portion of the light guiding body 107 can be suppressed to a low value while all the light is reflected in accordance with Snell's law.

Figure 8:
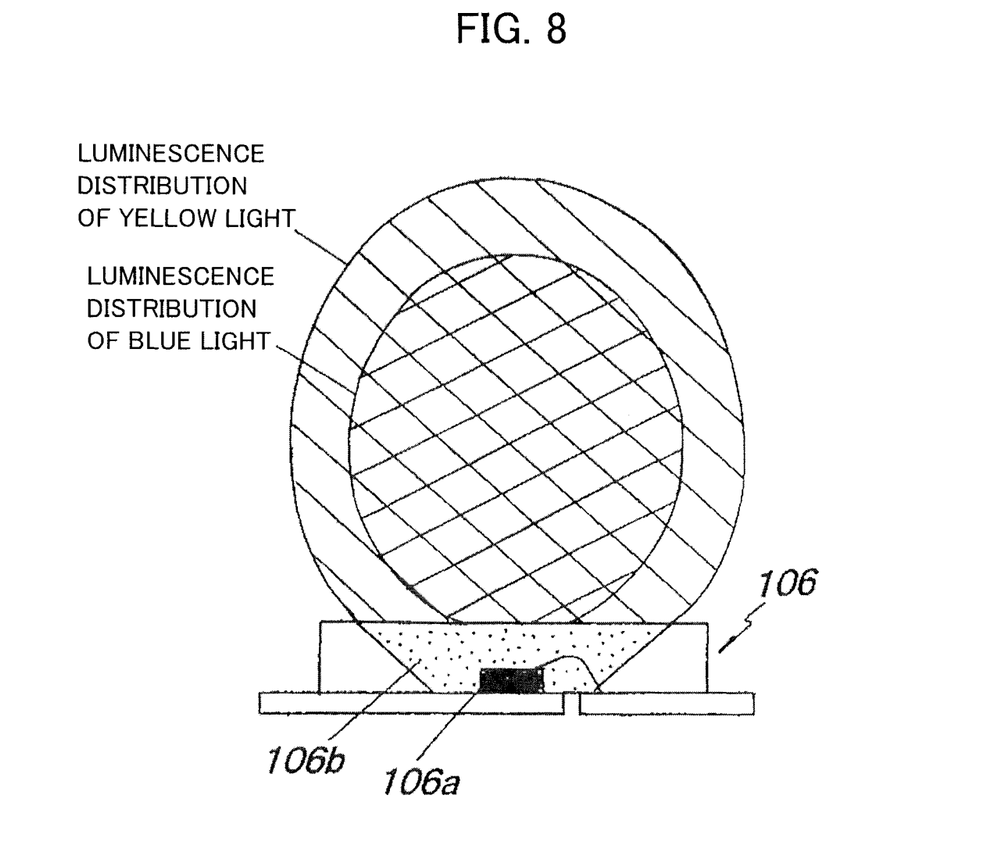
FIG. 8 illustrates the luminescence distribution and the configuration of the LED that emits white light.

However, when a LED that emits white light is used as the LED 106, as illustrated in FIG. 8, the LED 106 is configured by disposing a yellow phosphor 106b on a blue LED chip 106a, and pseudo-emitting white light by superimposition of the blue and yellow colors.

However, the luminescence distribution of blue and yellow light are different from each other as illustrated in FIG. 8. The blue-light LED chip 106a has a small illumination surface area relative to the overall illumination surface area of the LED that emits white light (surface area of the yellow phosphor 106b), and the luminescence distribution of blue light is narrow when compared with the luminescence distribution of yellow light. Therefore, the luminescence distribution of blue light after passing from the incident surface 107a of the light guiding body 107 to become incident into the light guiding body 107 is narrow relative to the luminescence distribution of yellow light.

In this context, the white LED light that illuminates the document surface at a position corresponding to a position in proximity to the incident surface 107a of the light guiding body 107 is completely reflected directly by the prism 121 without contacting the side surface of the light guiding body 107. As a result, the luminescence distribution of the white LED light illuminates the document surface in proximity to the incident surface 107a of the light guiding body 107, and in particular, has a considerable effect on the cross-sectional distribution of light. Although yellow light that has a wide luminescence distribution and the cross-sectional distribution of that light is wide, blue light has a narrow luminescence distribution and the cross-sectional distribution of that light is narrow. Therefore, when the document separates from the platen glass, or the reading optical axis varies, there may be a change in the granularity configuration of a solid image or a tint in the scanning image of the document image corresponding to a position in proximity to the incident surface 107a of the light guiding body 107.

Figure 9:
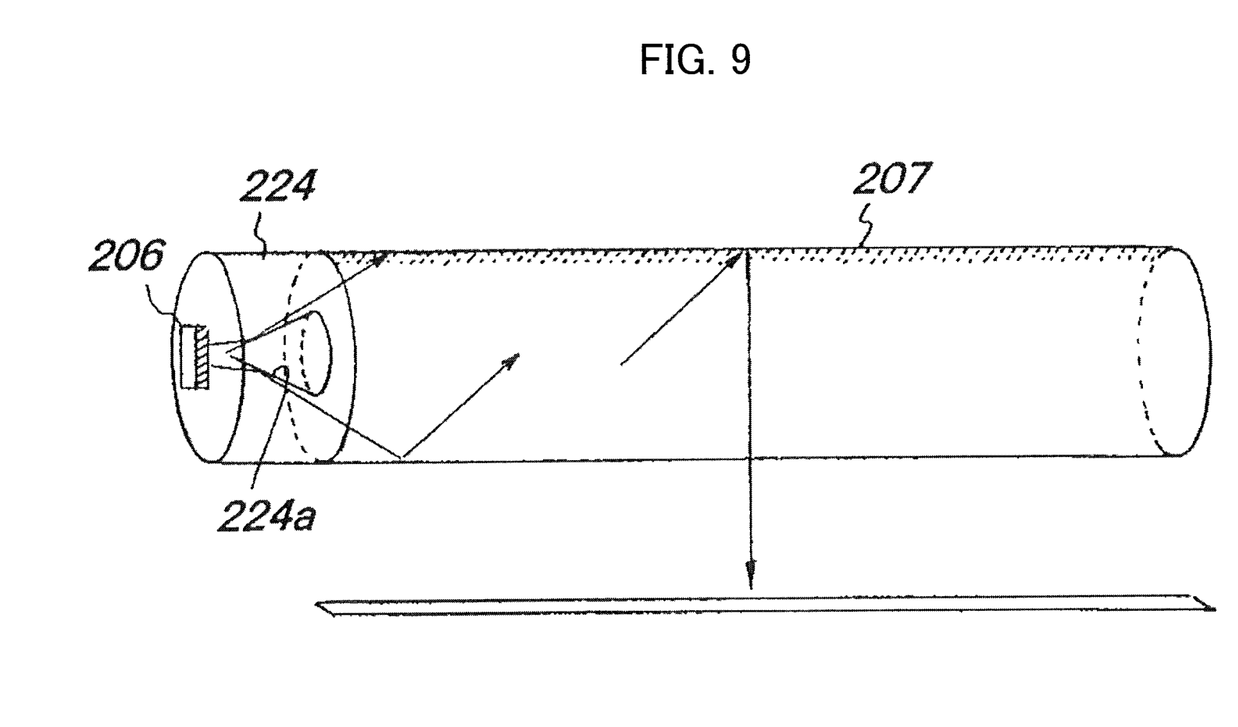
FIG. 9 is a perspective view illustrating the configuration of the light guide body proposed according to related technique.

In this context, a technique in which a reflecting body 224 that includes a conical cavity 224a that has an apex near to the LED 206 is disposed between the LED 206 and the end surface of the light guiding body 207 as illustrated in FIG. 9. According to the related technique, light emitted from the LED 206 becomes incident upon the light guiding body 207 via the reflective body 224, and thereby enables an increase in the luminescence distribution immediately after the light becomes incident and an increase in the cross-sectional distribution of blue light in proximity to the LED 206.

SUMMARY

The image reading apparatus includes a LED that emits white light, a light guiding body, and a photoelectric conversion element.

The LED that emits white light includes a light emitting surface and emits light from the light emitting surface.

The light guiding body is a cylindrical light guiding body disposed along the main scanning direction.

The light guiding body includes an incident surface, a plurality of groove portions, an emission surface, and a scattering portion. The incident surface is formed on one end in a longitudinal direction, faces the light emitting surface of the LED that emits white light, and receives incident light that is emitted from the light emitting surface. The plurality of groove portions is formed on the incident surface and is formed concentrically to the center of the incident surface. The emission surface is formed along the main scanning direction. The scattering portion scatters light and includes a plurality of prisms. The scattering portion is opposed to the light emitting surface and is disposed along the main scanning direction.

The photoelectric conversion element converts light that is emitted from the emission surface and reflected by the document surface into an electrical signal to thereby read a document image.

The image forming apparatus includes an image reading apparatus and an image forming unit.

The image reading apparatus includes the LED that emits white light, the light guiding body, and the photoelectric conversion element.

The LED that emits white light includes the light emitting surface, and emits light from the light emitting surface.

The light guiding body is a cylindrical light guiding body that is disposed along the main scanning direction.

The light guiding body includes an incident surface, a plurality of groove portions, the emission surface, and the scattering portion. The incident surface is formed on one end in a longitudinal direction, faces the light emitting surface of the LED that emits white light, and receives incident light that is emitted from the light emitting surface. The plurality of groove portions is formed on the incident surface concentrically to the center of the incident surface. The emission surface is formed along the main scanning direction. The scattering portion scatters light and includes a plurality of prisms. The scattering portion is opposed to the light emitting surface and is disposed along the main scanning direction.

The photoelectric conversion element converts light that is emitted from the emission surface and reflected by the document surface into an electrical signal to thereby read the document image.

The image forming apparatus forms an image read by the image reading apparatus on a surface of the image formation target material.

DETAILED DESCRIPTION

The configuration of the embodiments according to the present disclosure will be described below making reference to the attached figures.

Figure 1:
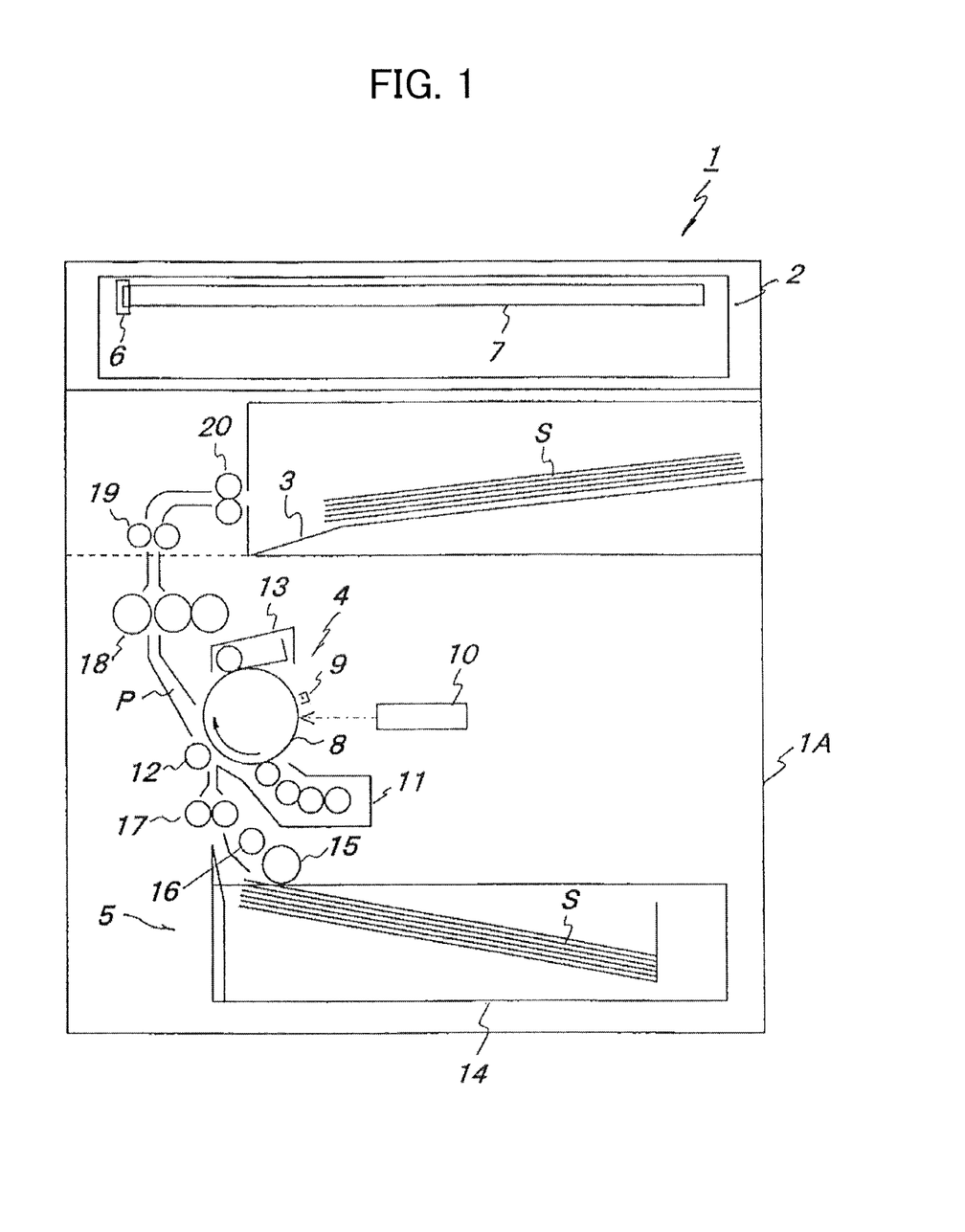
FIG. 1 is a side sectional view of an image forming apparatus according to the present disclosure.

FIG. 1 is a side sectional view of an image forming apparatus according to the present disclosure. As illustrated in FIG. 1, the image forming apparatus is a monochrome copying machine. The image forming apparatus 1 includes an apparatus main body 1A, and an image reading apparatus 2 related to the present disclosure that is disposed on an upper portion of the apparatus main body 1A. An ejected paper tray 3 is disposed below the image reading apparatus 2. The image forming unit 4 is disposed on an inner portion of the apparatus main body 1A. A sheet feeding unit 5 is disposed below the apparatus main body 1A.

The image reading apparatus 2 is configured to include a LED (Light emitting diode) 6 that emits white light is disposed on one end in the main scanning direction (transverse direction of FIG. 1), and a transparent light guiding body 7 that guides light that is incident from the incident surface 7a that faces the LED 6 in the main scanning direction. The image reading apparatus 2 is an apparatus for illuminating a document using a side light method to thereby read an image of the document.

The LED 6 that emits white light and the light guiding body 7 are configured to displace integrally with a carriage. The LED 6 that emits white light and the light guiding body 7 are supported to undergo reciprocating motion integrally in the sub-scanning direction (the anteroposterior direction to the surface of the sheet in FIG. 1).

Although not shown in the figures, an imaging lens for forming an image based on reflected light that is reflected from the document and a photoelectric conversion element for reading the image formed by the imaging lens by conversion into an electrical signal. The photoelectric conversion element converts light that is emitted from the emission surface 7b and reflected by the document surface into an electrical signal. The photoelectric conversion element generates an electrical signal including image information.

The image forming unit 4 forms an image using an electrographic method. The image forming unit 4 includes a photosensitive drum 8 that is rotatably disposed as an image carrier member, an electric charger 9, a laser scanner unit (LSU) 10, a developing device 11, a transfer roller 12 and a cleaning apparatus 13. The laser scanner unit (LSU) 10, the developing device 11, the transfer roller 12 and the cleaning apparatus 13 are disposed on the periphery of the photosensitive drum 8. The image forming unit 4 forms an image read by the image reading apparatus 2 on the surface of the paper (image formation target material). The image forming unit 4 forms an image on the surface of the paper based on the electrical signal (image information) output by the photoelectric conversion element.

The sheet feeding unit 5 includes a detachable sheet cassette 14, a pick roller 15 and a paper feed roller 16 that are disposed in proximity to the detachable sheet cassette 14. A plurality of sheets of paper S is stacked and stored in the sheet cassette 14. The paper S in the sheet cassette 14 is removed in series from the uppermost sheet by the pick roller 15 and fed into a paper path P by the paper feed roller 16.

The paper path P extends upwardly from the sheet feeding unit 5 to the ejected paper tray 3. A regist roller 17 (paper stop roller), the transfer roller 12, a fixing apparatus 18, a conveyance roller 19, and a discharge roller 20 are disposed in series vertically from below (from the upstream side of the conveyance direction of the paper S) on the paper path P.

The image forming operation of the image forming apparatus 1 configured as described above will be described below.

When the image forming operation is commenced, the photosensitive drum 8 in the image forming unit 4 is driven to rotate in the direction of the arrow (clockwise direction) in FIG. 1 by a drive means (not illustrated), and a uniform predetermined potential is applied to the surface of the drum by the electric charger 9. A document image is read in the image reading apparatus 2 as described below, a laser beam is outputted from the laser scanner unit 10 based on the electrical signal sent from the image reading apparatus 2 to expose and scan the surface of the photosensitive drum 8 and thereby form an electrostatic latent image on the photosensitive drum 8 in response to the image information. The electrostatic latent image formed on the photosensitive drum 8 is visualized as a toner image by development of toner as a developing material by the developing device 11.

Furthermore, the paper S stored in the sheet cassette 14 of the sheet feeding unit 5 is picked up from the uppermost sheet by the pick roller 15, and fed to the paper path P by the paper feed roller 16. The paper S that is fed to the paper path P in this manner is conveyed in the paper path P by the regist roller 17, and after being in a temporary stand-by state in the regist roller 17, is fed to the image forming unit 4 at a predetermined timing that is synchronized with the toner image on the photosensitive drum 8.

The paper S that is supplied to a transfer nip between the photosensitive drum 8 and the transfer roller 12 in the image forming unit 4 is pressed and conveyed onto the photosensitive drum 8 by the transfer roller 12 to thereby transfer the toner image on the photosensitive drum 8 onto the paper surface. The paper S onto which the toner image has been transferred is conveyed to the fixing apparatus 18 and heat and pressure are applied by passing through the fixing nip of the fixing apparatus 18 to thereby fix the toner image. Residual toner (excess transfer toner) present on the surface of the photosensitive drum 8 after transfer of the toner image to the paper S is removed by the cleaning apparatus 13, and the photosensitive drum 8 with a cleaned surface is ready to the next image forming operation.

The paper S with a toner image fixed to the surface by the fixing apparatus 18 is conveyed to the discharge roller 20 along the paper path P by the conveyance roller 19 and is discharged to the ejected paper tray 3 by the discharge roller 20 to thereby complete a series of image forming operations.

[Image Reading Apparatus]

Next the configuration of the image reading apparatus 2 according to the present disclosure will be described below making reference to FIG. 2 to FIG. 5.

Figure 2:
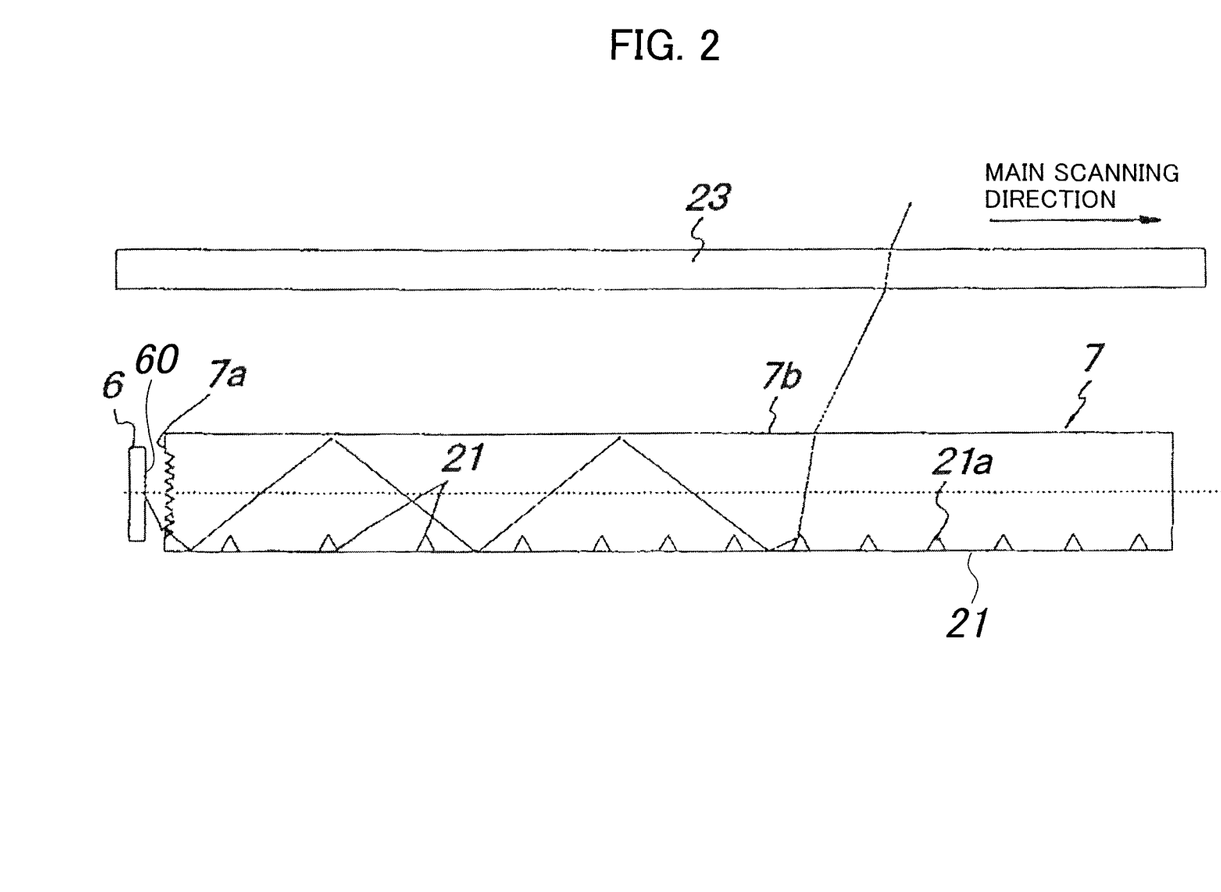
FIG. 2 is a side view of the illumination portion of the image reading apparatus according to the present disclosure.
Figure 3:
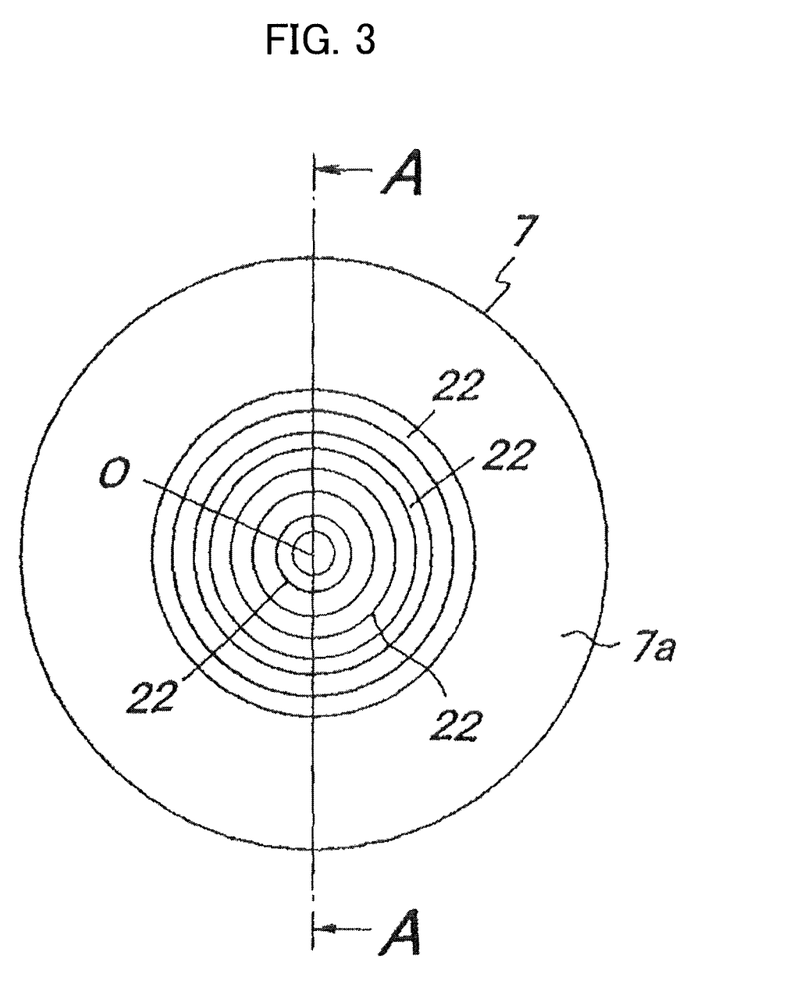
FIG. 3 is a front view of the light guiding body of the image reading apparatus according to the present disclosure.
Figure 4:
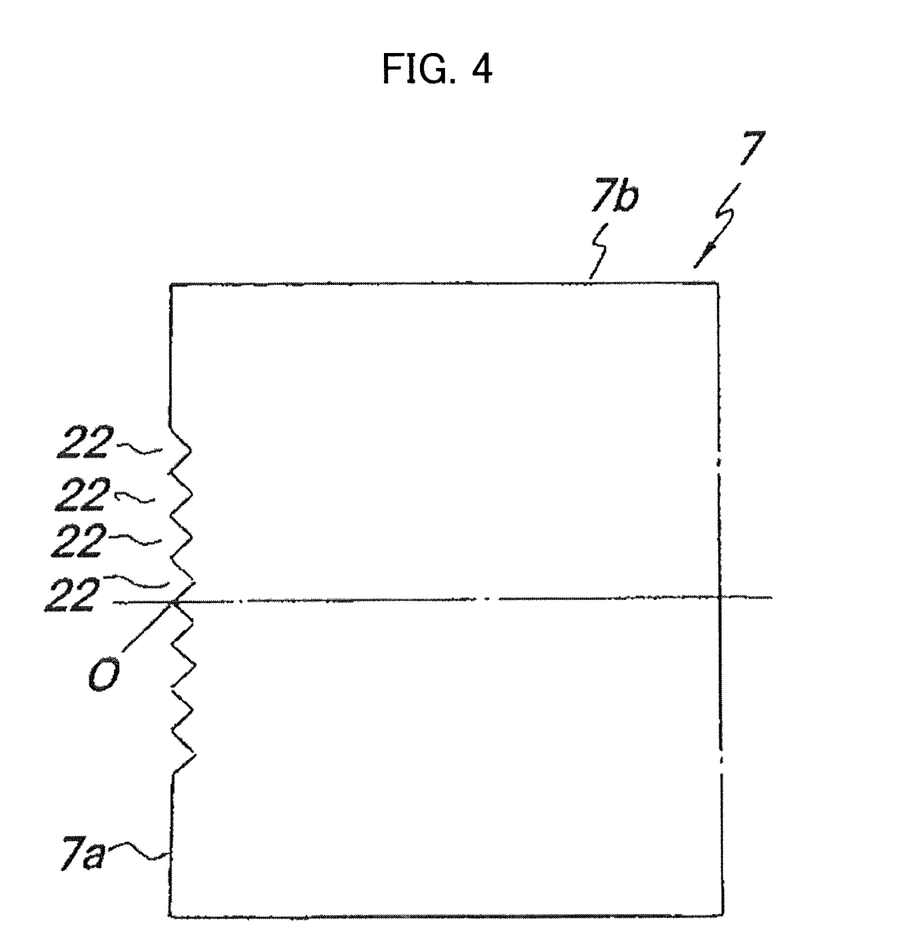
FIG. 4 is a sectional view along the line A-A in FIG. 3.
Figures 5A, 5B:
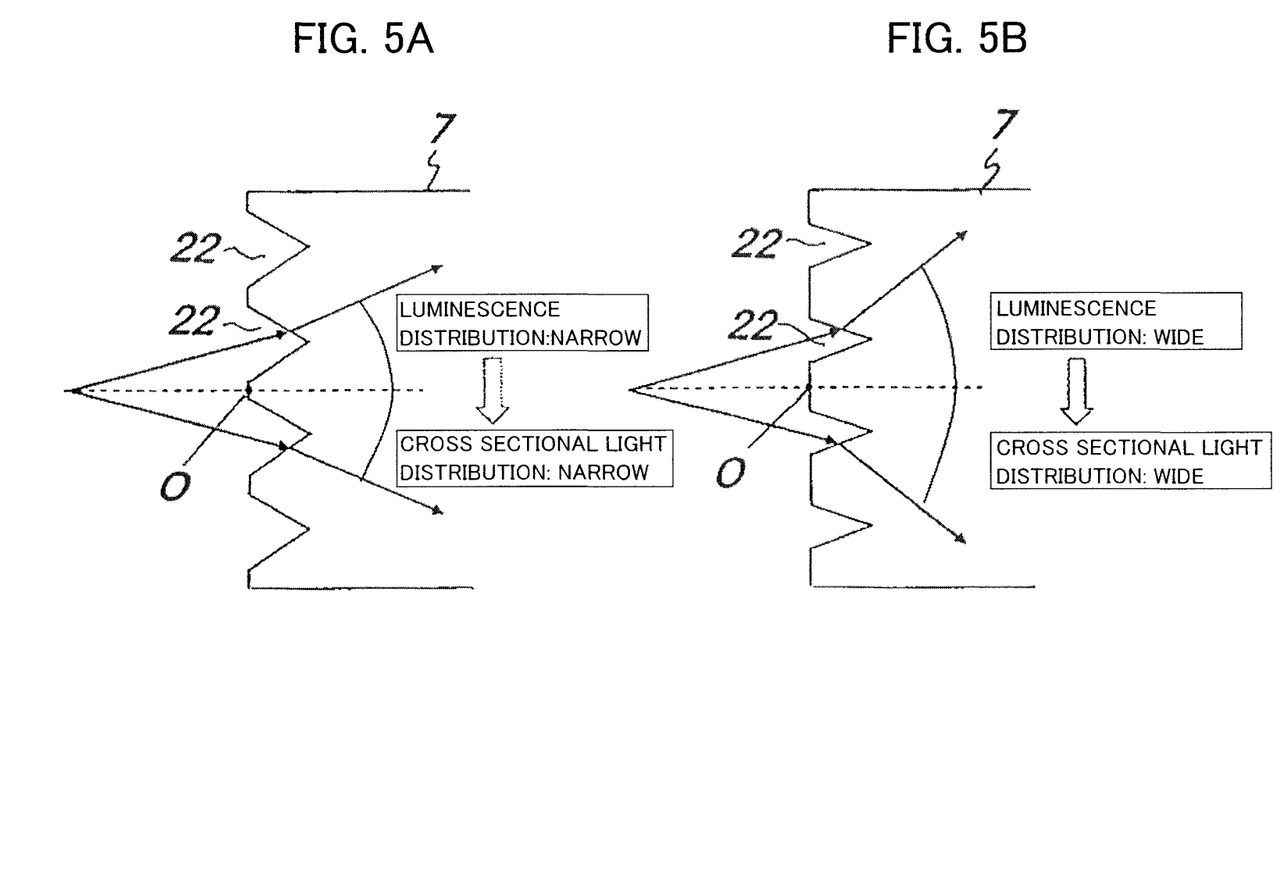
FIG. 5A is a sectional view illustrating the luminescence distribution when the angle of the V-shaped groove formed on the incident surface of the light guiding body of the image reading apparatus according to the present disclosure is a first angle.
FIG. 5B is a sectional view illustrating the luminescence distribution when the angle of the V-shaped groove formed on the incident surface of the light guiding body of the image reading apparatus according to the present disclosure is a second angle.

FIG. 2 is a side view of the illumination portion of the image reading apparatus according to the present disclosure. FIG. 3 is a front view of the light guiding body of the image reading apparatus according to the present disclosure. FIG. 4 is a sectional view along the line A-A in FIG. 3. FIG. 5A is a sectional view illustrating the luminescence distribution when the angle of the V-shaped groove formed on the incident surface of the light guiding body of the image reading apparatus according to the present disclosure is a first angle. FIG. 5B is a sectional view illustrating the luminescence distribution when the angle of the V-shaped groove formed on the incident surface of the light guiding body of the image reading apparatus according to the present disclosure is a second angle.

As illustrated in FIG. 2, the light guiding body 7 is a cylindrical light guiding body. The light guiding body 7 is disposed along the main scanning direction. The light guiding body 7 is a cylindrical light guiding body that is elongated along the main scanning direction.

The light guiding body 7 includes an incident surface 7a that is formed on one end surface of the body 7. The incident surface 7a is arranged to face the light emitting surface 60 of the LED 6 that emits white light.

The light guiding body 7 includes the emission surface 7b. The emission surface 7b is formed along the main scanning direction. The emission surface 7b is formed on the platen glass side (upper surface side) on the light guiding body 7.

The light guiding body 7 includes the light scattering portion 21. The light scattering portion 21 is disposed on the lower surface side facing the emission surface 7b. The light scattering portion 21 includes a plurality of V-groove shaped light-scattering prisms 21a disposed at a predetermined interval in the main scanning direction.

The LED 6 that emits white light includes the emission surface 60, and emits light from the emission surface 60. The LED 6 that emits white light is configured by disposing a yellow phosphor on a blue LED chip, and pseudo-emitting white light by superimposition of the blue and yellow colors (reference is made to FIG. 8).

The light guiding body 7 and the LED 6 that emits white light configures the illumination portion of the image reading apparatus 2 is supported to reciprocate in the sub-scanning direction (the anteroposterior direction to the surface of the sheet in FIG. 2) by the carriage (not illustrated).

In the present embodiment, as illustrated in FIG. 3 and FIG. 4, a plurality (four in the example in the figure) of V-shaped grooves 22 (groove portions) formed concentrically to the periphery about a center O of the incident surface 7a are formed on the incident surface 7a of the light guiding body 7. The plurality of V-shaped grooves 22 are formed on the incident surface and are formed concentrically to the center of the incident surface. The respective grooves in the plurality of V-shaped grooves 22 are configured in the shape of a letter "V" when viewed in section.

The platen glass 23 is disposed above the light guide body 7 for mounting of a document.

When an electrical current is supplied to the LED 6 that emits white light, the blue LED chip of the LED 6 emits light to thereby emit blue light. The blue light passes through the yellow phosphor to thereby cause pseudo-emission (light emission) of white light by the LED 6.

The white light that is the subject of pseudo-emission by the LED 6 becomes incident on an inner portion of the light guiding body 7 from the incident surface 107a of the light guiding body 107 as illustrated in FIG. 2 while being subjected to refraction in accordance with Snell's law.

In the present embodiment, when the blue light associated with light that has a narrow cross-sectional distribution contained in the white light becomes incident from the incident surface 7a into the light guiding body 7, the luminescence distribution is expanded by refraction of the blue light by the concentric V-shaped grooves 22 formed on the incident surface 7a of the light guiding body 7 as illustrated in FIG. 5A and FIG. 5B. In this manner, the image reading apparatus 2 can expand the cross-sectional distributed blue light contained in light of each color.

Therefore, in the image reading apparatus 2, even when a portion that corresponds to the proximity of the incident surface 7a of the light guiding body 7 in the document disposed on the platen glass 123 separates from the platen glass 123, and the reading optical axis is varied, a change in the granularity configuration of a solid image or a tint in the scanning image of the document in the portion corresponding to a position in proximity to the incident surface 107a of the light guiding body 107 can be suppressed. The image forming apparatus 1 illustrated in FIG. 1 enables consistently high image quality. The above effect enables use of a simple configuration by merely forming V-shaped grooves 22 in a concentric configuration on the incident surface 7a of the light guide body 7 and without the addition of a separate member. Additionally, this configuration is advantageous from a cost consideration.

Figure 6:
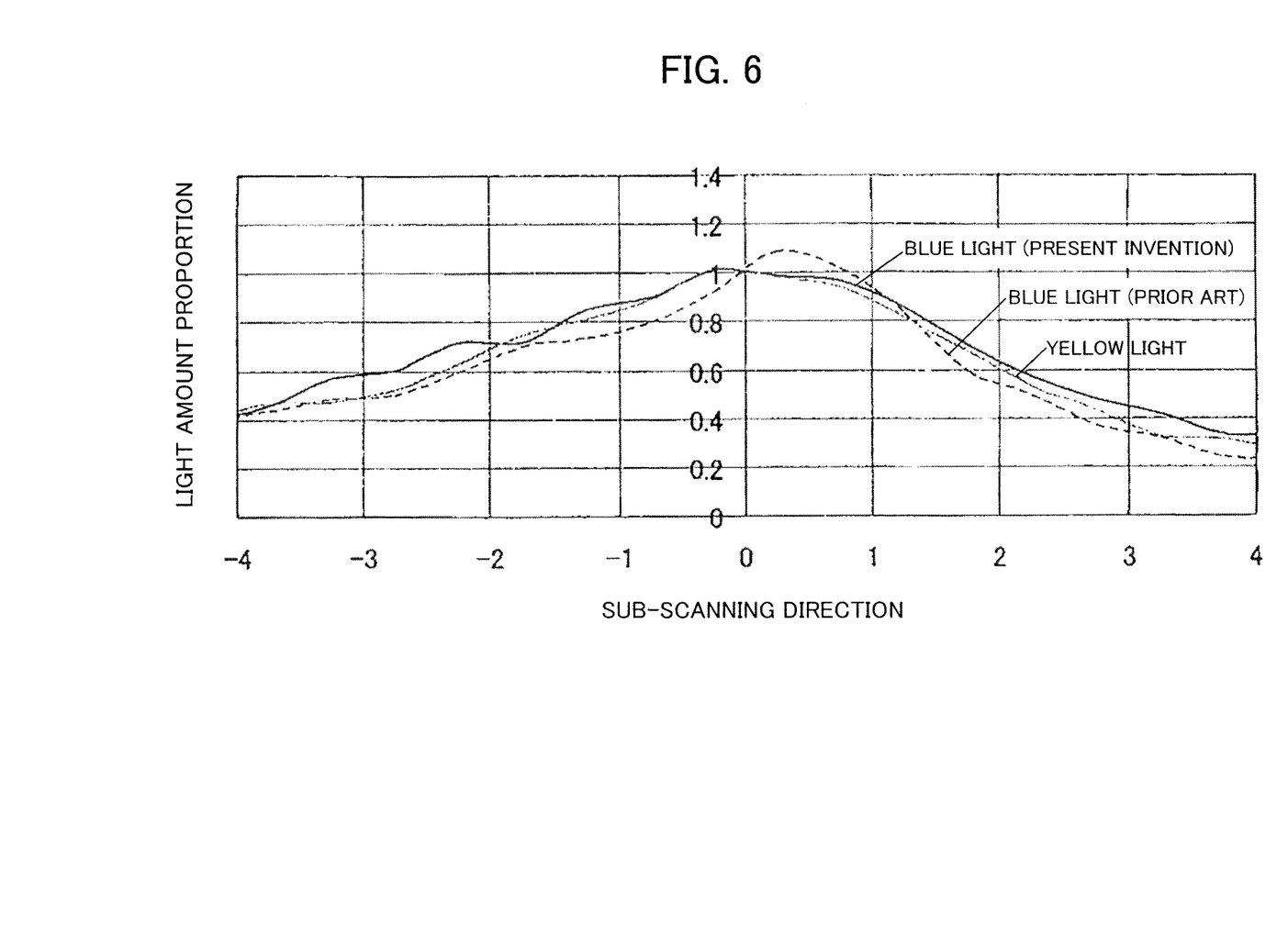
FIG. 6 illustrates the cross-sectional distributed light in the sub-scanning direction.

FIG. 6 respectively illustrates the cross-sectional distributed light in the sub-scanning direction of blue light and yellow light that is incident on the light guiding body 7 according to the present disclosure and the blue light that is incident on the light guiding body 107 (reference is made to FIG. 7). As illustrated in FIG. 6, the cross-sectional distributed blue light that is incident on the light guiding body 7 according to the present disclosure is expanded. The expansion in the cross-sectional distributed light means an increase in the amount of light (light amount proportion) at a position that is separated from the center (in the sub-scanning direction).

As illustrated in FIG. 5A and FIG. 5B, the image reading apparatus 2 is configured to enable control of the degree of expansion of the light distribution of blue light by varying the angle of the V-shaped grooves 22 formed in the incident surface 7a of the light guiding body 7. More precisely, as illustrated in FIG. 5A, when the angle of the V-shaped grooves 22 is a first angle (larger than a second angle), the light distribution of blue light is relatively narrow (the degree of expansion of the cross-sectional distributed of blue light is smaller). When the angle of the V-shaped grooves 22 is a second angle (smaller than the first angle) as illustrated in FIG. 5B, the light distribution of blue light is relatively wide (the degree of the expansion of the cross-sectional distributed of blue light is greater).

In the same manner, even when the depth or the interval of the V-shaped grooves 22 is changed, the light distribution of blue light can be varied. Therefore, the image reading apparatus 2 (image forming apparatus 1) is configured to enable control of the cross-sectional distributed light in proximity to the incident surface 7a of the light guiding body 7 by variation of the angle, depth and interval of the V-shaped groove 22 in response to the distance from the center O of the incident surface 7a of the light guiding body 7.

That is to say, the image reading apparatus 2 (image forming apparatus 1) may be configured so that the angle of the V shape in the plurality of V-shaped grooves 22 changes in response to the distance from the center of the incident surface.

The image reading apparatus 2 (image forming apparatus 1) may be configured so that the depth of the groove in the plurality of V-shaped grooves 22 is changed in response to the distance from the center of the incident surface.

The image reading apparatus 2 (image forming apparatus 1) may be configured so that the interval between the plurality of V-shaped grooves 22 is changed in response to the distance from the center of the incident surface.

According to the disclosure in the present embodiment, when blue light that is associated with narrow cross-sectional distributed light is emitted from the LED and becomes incident from the incident surface of the light guiding body into the light guiding body, the image reading apparatus 2 (image forming apparatus 1) expands the cross-sectional distributed light since the luminescence distribution is expanded by refraction of blue light in the V-shaped grooves that are concentrically formed on the incident surface of the light guiding body. As a result, even when a portion that corresponds to the proximity of the incident surface of the light guiding body in the document disposed on the platen glass separates from the platen glass, and the reading optical axis is varied, the image reading apparatus 2 (image forming apparatus 1) is configured to suppress a change in the granularity configuration of a solid image or a tint in the scanning image of the document image in a position in proximity to the incident surface of the light guiding body. The above effect enables use of a simple configuration by merely forming V-shaped grooves in a concentric configuration on the incident surface of the light guide body and without the addition of a separate member. Additionally, this configuration is advantageous from a cost consideration.

According to the disclosure of the present embodiment, the image forming apparatus 1 is configured to enable stable formation of high quality images.

This embodiment has described a disclosure as applied to a monochrome copying machine and to an image reading apparatus provided with the copying machine. However, it is obvious that this disclosure may be apply in the same manner also in relation to another arbitrary image forming apparatus such as a facsimile, multifunction peripheral, or the like in addition to the copying machine whether color or monochrome, and to an image reading apparatus provided with such a device.

In the above embodiment, although the plurality of respective V-shaped grooves 22 is formed completely in a circular shape, there is no limitation to the circular shape used in this disclosure. A circular shape may be formed along a circle or the grooves may not be configured in a completely connected configuration. Furthermore, the V-shaped grooves 22 may be formed in an oval shape in addition to formation in a perfect circle.

In the present embodiment, although the plurality of V-shaped grooves 22 is formed in a V shape when viewed in cross section, the groove portions in this disclosure are not limited thereby and may be formed so that the inner surface curves into a U shape or a V shape.

The invention claimed is:
1. An image reading apparatus comprising:
a LED (Light emitting diode) that has a light emitting surface and that emits pseudo-white light from the light emitting surface, the pseudo-white light being generated by blue light which is emitted b a blue LED chip and penetrates a yellow phosphor disposed on the blue LED chip;
a cylindrical light guiding body that is disposed along a main scanning direction,
the light guiding body having
a substantially round incident surface formed on one axial end of the cylindrical light guiding body, the substantially round incident surface facing the light emitting surface of the LED such that a center of the light emitting surface is aligned with a center of the substantially round incident surface, and receiving the pseudo-white light that is emitted from the light emitting surface,
a plurality of grooves formed on the substantially round incident surface, the grooves configured to be concentric with each other and a center of the grooves configured to be concentric to the center of the substantially round incident surface,
an emission surface formed along the main scanning direction, and
a scattering portion scattering the pseudo-white light and including a plurality of V-groove shaped prisms disposed at a predetermined interval, the scattering portion opposed to the emission surface and disposed along the main scanning direction; and
a photoelectric conversion element converting the pseudo-white light that is emitted from the emission surface and reflected by a document surface into an electrical signal to thereby read a document image, wherein each of the grooves is configured to be shaped like a letter "V" when viewed in section and a full circle when viewed in a direction perpendicular to the substantially round incident surface, and to be in a same sectional shape over an entirety of a circumference of the circle, and wherein an angle, depth and interval of the V-shaped grooves are selected to produce a cross-sectional light in proximity to the substantially round incident surface.

2. An image forming apparatus comprising the image reading apparatus according to claim 1.

3. An image reading apparatus comprising:

a white light emitting diode (LED) configured to emit pseudo white light to illuminate a surface of a document, the pseudo white light being generated from blue light which is emitted by a blue LED and passes through a yellow phosphor;

a cylindrical light guiding body configured to guide the pseudo white light in a main scanning direction which is emitted by the white LED and incident on a substantially round incident surface which is formed on one axial end of the cylindrical light guiding body;

a photoelectric conversion element configured to convert the pseudo white light which is emitted by an emission surface of the light guiding body and reflected off the surface of a document into an electrical signal to read an image of the document; and a plurality of V-groove shaped prisms for light diffusion disposed at a predetermined interval in the main scanning direction at a surface opposite to the emission surface of the light guiding body, wherein the white LED is disposed such that the center of a light emitting surface of the white LED is aligned with the center of the substantially round incident surface of the light guiding body, wherein a plurality of V-shaped grooves are formed at the substantially round incident surface of the light guiding body the V-shaped grooves configured to be concentric with each other and a center of the V-shaped grooves configured to be concentric to the center of the substantially round incident surface, wherein each of the V-shaped grooves is configured to be shaped like a full circle when viewed in a direction perpendicular to the substantially round incident surface and in a same sectional shape over an entirety of a circumference of the ring, and wherein an angle, depth and interval of the V-shaped grooves are selected to produce a cross-sectional light in proximity to the substantially round incident surface.

4. An image forming apparatus comprising the image reading apparatus according to claim 3.

* * * * *